United States Patent
Herrera (10) Patent No.: US 10,981,573 B2
(45) Date of Patent: Apr. 20, 2021

(54) ESTIMATOR AND METHOD

(71) Applicant: Jaguar Land Rover Limited, Coventry (GB)

(72) Inventor: Juan Herrera, Coventry (GB)

(73) Assignee: JAGUAR LAND ROVER LIMITED, Coventry (GB)

(*) Notice: Subject to any disclaimer, the term of this patent is extended or adjusted under 35 U.S.C. 154(b) by 202 days.

(21) Appl. No.: 16/023,365

(22) Filed: Jun. 29, 2018

(65) Prior Publication Data

US 2019/0047573 A1 Feb. 14, 2019

(30) Foreign Application Priority Data

Aug. 14, 2017 (GB) .................................... 1712985

(51) Int. Cl.
| | |
|---|---|
| *B60W 40/06* | (2012.01) |
| *B60W 30/14* | (2006.01) |
| *B60W 40/107* | (2012.01) |
| *B60W 40/109* | (2012.01) |

(Continued)

(52) U.S. Cl.
CPC .......... *B60W 40/06* (2013.01); *B60W 30/146* (2013.01); *B60W 40/107* (2013.01); *B60W 40/109* (2013.01); *B60W 40/11* (2013.01); *B60W 40/112* (2013.01); *B60W 2552/05* (2020.02); *B60W 2552/35* (2020.02)

(58) Field of Classification Search
CPC .. B60W 40/06; B60W 40/107; B60W 40/109; B60W 40/11; B60W 40/112; B60W 30/146; B60W 2552/35; B60W 2552/05

USPC ........................................................ 701/93
See application file for complete search history.

(56) References Cited

U.S. PATENT DOCUMENTS

| | | | | |
|---|---|---|---|---|
| 4,985,838 | A | * 1/1991 | Hashiguchi | B60T 8/175 701/90 |
| 5,117,934 | A | * 6/1992 | Tsuyama | B60T 8/172 180/197 |
| 5,425,574 | A | 6/1995 | Sano | |

(Continued)

FOREIGN PATENT DOCUMENTS

| | | |
|---|---|---|
| GB | 2492655 A | 1/2013 |
| GB | 2492748 A | 1/2013 |

(Continued)

OTHER PUBLICATIONS

Recherchebericht (Research Report), DE Application No. 10 2018 212 299.7, dated Sep. 3, 2019, 15 pp.

(Continued)

*Primary Examiner* — Krishnan Ramesh
(74) *Attorney, Agent, or Firm* — Reising Ethington P.C.

(57) ABSTRACT

A surface roughness estimator for a vehicle configured to generate a first surface roughness index value indicative of terrain surface roughness and to output a signal in dependence at least in part on the first surface roughness index value, the estimator being configured to receive first acceleration information indicative of a first acceleration along a first axis, receive second acceleration information indicative of a second acceleration along a second axis, calculate a combined value in dependence on the first acceleration and second acceleration, and adjust the combined value in dependence on a speed of the vehicle to generate the first surface roughness index value.

15 Claims, 8 Drawing Sheets

(51) Int. Cl.
  *B60W 40/11* (2012.01)
  *B60W 40/112* (2012.01)

(56) References Cited

U.S. PATENT DOCUMENTS

| | | | |
|---|---|---|---|
| 6,292,759 B1* | 9/2001 | Schiffmann | B60T 8/172 |
| | | | 340/440 |
| 7,349,776 B2 | 3/2008 | Spillane et al. | |
| 2008/0251307 A1 | 10/2008 | Bell | |
| 2009/0037070 A1* | 2/2009 | Nakamura | B60W 40/072 |
| | | | 701/96 |
| 2009/0164060 A1 | 6/2009 | Fortson et al. | |
| 2016/0031444 A1* | 2/2016 | Fairgrieve | B22D 21/005 |
| | | | 701/93 |
| 2016/0244065 A1 | 8/2016 | Wagner | |
| 2016/0244066 A1 | 8/2016 | Tani et al. | |
| 2017/0274855 A1* | 9/2017 | Laskey | B60W 40/06 |
| 2017/0370301 A1* | 12/2017 | Srinivasan | F02D 41/0225 |
| 2018/0141560 A1* | 5/2018 | Anker | B60W 50/082 |
| 2018/0194286 A1* | 7/2018 | Stein | B60W 30/143 |
| 2018/0362021 A1* | 12/2018 | Imamura | B60W 30/18172 |

FOREIGN PATENT DOCUMENTS

| | | |
|---|---|---|
| GB | 2499279 A | 8/2013 |
| GB | 2499461 A | 8/2013 |
| GB | 2507622 A | 5/2014 |
| GB | 2508464 A | 6/2014 |
| JP | 2005-315675 A | 11/2005 |
| WO | 2013124321 A1 | 8/2013 |
| WO | 2014139875 A1 | 9/2014 |

OTHER PUBLICATIONS

Patents Act 1977: Combined Search and Examination Report under Sections 17 and 18(3), UKIPO Application No. GB1712985.9, dated Jan. 30, 2018, 7 pp.

* cited by examiner

ESTIMATOR AND METHOD

RELATED APPLICATION

This application claims priority under 35 U.S.C § 119 to Great Britain Patent Application No. GB1712985.9, filed Aug. 14, 2017, the content of which is incorporated herein by reference as if set forth in its entirety.

FIELD OF THE INVENTION

Embodiments of the invention relates to a surface roughness estimator, and to a method of estimating a surface roughness. In particular, but not exclusively, some embodiments of the invention relate to a controller for controlling a vehicle adapted for driving in an off-road environment.

BACKGROUND

It is known to provide a control system for a motor vehicle for controlling one or more vehicle subsystems in accordance with one or more characteristics or the terrain or ground surface type over which the vehicle is travelling. U.S. Pat. No. 7,349,776 discloses a vehicle control system comprising a plurality of subsystem controllers including an engine management system, a transmission controller, a steering controller, a brakes controller and a suspension controller. The subsystem controllers are each operable in a plurality of subsystem function or configuration modes. The subsystem controllers are connected to a vehicle mode controller which controls the subsystem controllers to assume a required function mode so as to provide a number of driving modes for the vehicle. Each of the driving modes corresponds to a particular driving condition or set of driving conditions, and in each mode each of the subsystems is set to the function mode most appropriate to those conditions. Such conditions are linked to types of terrain over which the vehicle may be driven such as grass/gravel/snow, mud and ruts, rock crawl, sand and a highway mode known as 'special programs off' (SPO). The vehicle mode controller may be referred to as a Terrain Response (TR)® System or controller. The driving modes may also be referred to as terrain modes, terrain response modes, or control modes. GB2492655B discloses a control system for a motor vehicle in which the most appropriate terrain mode for the prevailing terrain over which the vehicle is driving is determined automatically by the control system. The control system then causes the vehicle to operate in the terrain mode determined to be the most appropriate. In these examples, an estimate of the surface roughness may be used to determine a driving condition or driving mode of the vehicle.

SUMMARY OF THE INVENTION

In one aspect of the invention for which protection is sought there is provided a surface roughness estimator for a vehicle configured to generate a first surface roughness index value indicative of terrain surface roughness and to output a signal in dependence at least in part on the first surface roughness index value, the estimator being configured to receive first acceleration information indicative of a first acceleration along a first axis, receive second acceleration information indicative of a second acceleration along a second axis, calculate a combined value in dependence on the first acceleration and second acceleration, and adjust the combined value in dependence on a speed of the vehicle to generate the first surface roughness index value.

The first acceleration and the second acceleration may comprise two of acceleration along a vertical axis, acceleration along a longitudinal axis and acceleration along a lateral axis of the vehicle.

The first acceleration may be lateral acceleration and the second acceleration may be vertical acceleration.

It is to be understood that, by combining the first acceleration value and second acceleration value and adjusting the combined value in dependence on vehicle speed, an indication of terrain surface roughness value may be obtained that is substantially independent of vehicle speed.

It is to be understood that in some embodiments lateral and longitudinal acceleration may be used instead, and in some still further embodiments vertical and longitudinal acceleration may be used.

Optionally, the combined value corresponds to the product of the first and second accelerations.

The surface roughness estimator may be configured to calculate a further first surface roughness index value calculated in dependence at least in part on a torque difference value, wherein the torque difference value is calculated in dependence at least in part on a difference between the amount of drive torque applied to driving wheels of the vehicle and the amount of torque required to achieve the instant value of longitudinal acceleration in the presence of a smooth driving surface.

The surface roughness estimator may be operable, when a set of one or more predetermined conditions are met, to select one of the first surface roughness index value and the further first surface roughness index value.

The surface roughness estimator may be operable to select one of the first surface roughness index value and the further first surface roughness index value by selecting the larger of the first surface roughness index value and the further first surface roughness index value.

Thus, the surface roughness estimator is able to calculate a measure of the amount by which terrain surface roughness deviates from that of a smooth driving surface by reference to any discrepancy in the amount of torque being applied to drive the vehicle and the amount of longitudinal acceleration that would be expected for that amount of drive torque, assuming a smooth, step-free driving surface.

The set of one or more predetermined conditions may include one or more of the following conditions;
 the speed of the vehicle is below a predetermined critical speed,
 the amount of drive torque applied to driving wheels of the vehicle exceeds a predetermined drive torque amount,
 the amount of longitudinal acceleration exceeds a predetermined longitudinal acceleration amount, and
 a transmission of the vehicle is in a gear having a number that is less than or equal to a predetermined gear number.

The predetermined critical speed may be 5 kph in some embodiments. Other values may be useful in some alternative embodiments.

The predetermined drive torque amount may be around 30 Nm in some embodiments. Other values may be useful in some alternative embodiments.

The predetermined longitudinal acceleration amount may be may be substantially zero in some embodiments. Other values may be useful in some alternative embodiments.

The predetermined gear number may be 2 in some embodiments. Other values may be useful in some alternative embodiments.

The surface roughness estimator may be configured to calculate second and third surface roughness index values in addition to the first surface roughness index value, wherein the second and third surface roughness index values correspond to vehicle roll acceleration and vehicle pitch acceleration.

The surface roughness estimator may be configured to calculate a terrain surface roughness value, the terrain surface roughness value being an average of the first, second and third surface roughness index values.

It is to be understood that, in some embodiments, the terrain surface roughness value may be calculated as the arithmetic mean of the first, second and third surface roughness index values.

The surface roughness estimator may comprise processing means, wherein the processing means comprises an electronic processor having an electrical input for receiving information indicative of the first acceleration and information indicative of the second acceleration, and an electronic memory device electrically coupled to the electronic processor and having instructions stored therein, wherein the processor is configured to access the memory device and execute the instructions stored therein such that it is operable to calculate a combined value in dependence on the first acceleration and second acceleration and to adjust the combined value in dependence on a speed of the vehicle to generate the first surface roughness index value.

In a further aspect of the invention for which protection is sought there is provided a motor vehicle controller in combination with a surface roughness estimator according to any preceding aspect, the motor vehicle controller being configured to control the vehicle in dependence at least in part on the signal generated by the surface roughness estimator.

The vehicle may comprise a surface roughness estimator according to a preceding aspect of a controller according to a preceding aspect.

The motor vehicle controller may be operable to maintain the vehicle speed, the maximum vehicle speed being determined in part on the signal generated by the surface roughness estimator.

In an aspect of the invention for which protection is sought there is provided a method of generating an estimate of surface roughness comprising generating a first surface roughness index value indicative of terrain surface roughness, the method comprising receiving first acceleration information indicative of a first acceleration along a first axis, receiving second acceleration information indicative of a second acceleration along a second axis, calculating a combined value in dependence on the first acceleration and second acceleration, the method comprising adjusting the combined value in dependence on vehicle speed to generate the first surface roughness index value.

The first acceleration and the second acceleration may comprise two of vertical acceleration, longitudinal acceleration and lateral acceleration of the vehicle.

The first acceleration may be lateral acceleration and the second acceleration may be vertical acceleration.

The combined value may correspond to a product of the first and second accelerations.

The method may comprise calculating a further first surface roughness index value calculated in dependence at least in part on a torque difference value, wherein the torque difference value is calculated in dependence at least in part on a difference between the amount of drive torque applied to driving wheels of the vehicle and the amount of torque required to achieve the instant value of longitudinal acceleration in the presence of a smooth driving surface.

The method may comprise, when a set of one or more predetermined conditions are met, selecting one of the first surface roughness index value and the further first surface roughness index value.

The method may comprise selecting the larger of the first surface roughness index value and the further first surface roughness index value.

The set of one or more predetermined conditions may include one or more of the following conditions;
the speed of the vehicle is below a predetermined critical speed,
the amount of drive torque applied to driving wheels of the vehicle exceeds a predetermined drive torque amount,
the amount of longitudinal acceleration exceeds a predetermined longitudinal acceleration amount, and
a transmission of the vehicle is in a gear having a number that is less than or equal to a predetermined gear number.

The method may comprise calculating second and third surface roughness index values in addition to the first surface roughness index value, wherein the second and third surface roughness index values correspond to vehicle roll acceleration and vehicle pitch acceleration.

The method may comprise calculating a terrain surface roughness value, the terrain surface roughness value being an average of the first, second and third surface roughness index values.

In a further aspect of the invention for which protection is sought there is provided a surface roughness estimator configured to generate a first surface roughness index value indicative of terrain surface roughness and to output a signal in dependence at least in part on the first surface roughness index value, the estimator being configured to receive information indicative of vehicle speed and at least two selected from amongst vertical acceleration information indicative of vertical acceleration, lateral acceleration information indicative of lateral acceleration and longitudinal acceleration information indicative of longitudinal acceleration, the estimator being configured to determine a combined value based at least in part on the information received thereby to generate the first surface roughness index value.

In an aspect of the invention for which protection is sought there is provided a computer program product executable on a processor so as to implement the method of another aspect.

In an aspect of the invention for which protection is sought there is provided a non-transitory computer readable medium carrying computer readable code which when executed causes a vehicle to carry out the method of another aspect.

In an aspect of the invention for which protection is sought there is provided a processor arranged to implement the method of another aspect, or the computer program product of another aspect.

The content of co-pending UK patent applications GB2507622 and GB2499461 are hereby incorporated by reference. The content of U.S. Pat. No. 7,349,776 and co-pending international patent applications WO2013124321 and WO2014/139875 are incorporated herein by reference. The content of UK patent applications GB2492748, GB2492655 and GB2499279 and UK patent GB2508464 are also incorporated herein by reference.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF DRAWINGS

The present invention will now be described, by way of example only, with reference to the accompanying drawings, in which.

DETAILED DESCRIPTION

Figure 1:
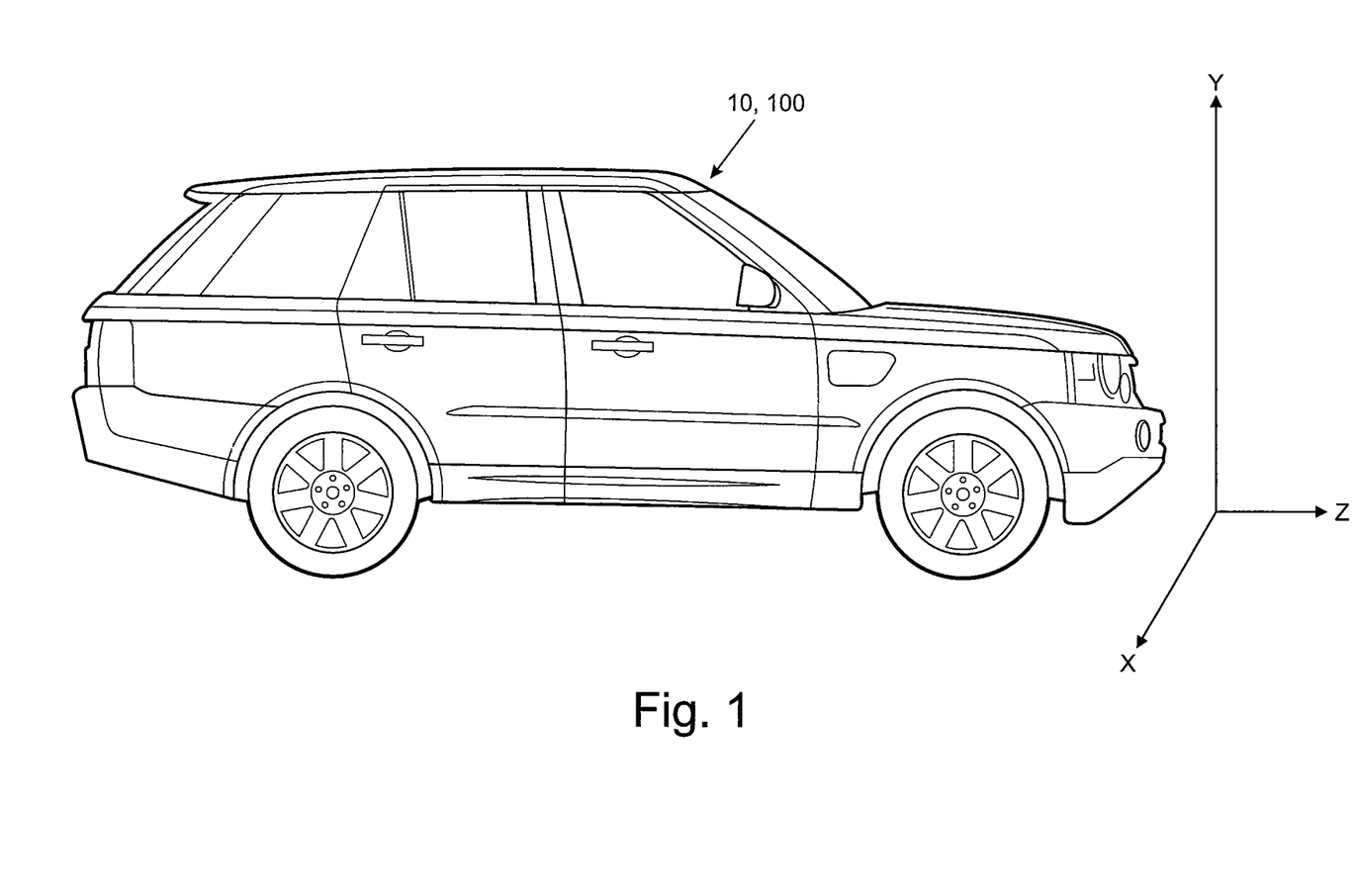
FIG. 1 shows a vehicle in side view illustrating axes of acceleration.

As shown in FIG. 1, a vehicle 10 has an associated vertical axis Y, a longitudinal axis Z generally parallel or co-axial with the length of the vehicle and the direction of travel of the vehicle, and a lateral axis X. Conventionally the axes X, Y, Z are mutually perpendicular. References to vertical, longitudinal and lateral acceleration refer to acceleration of the vehicle in a direction along or parallel to the respective axis.

Figure 2:
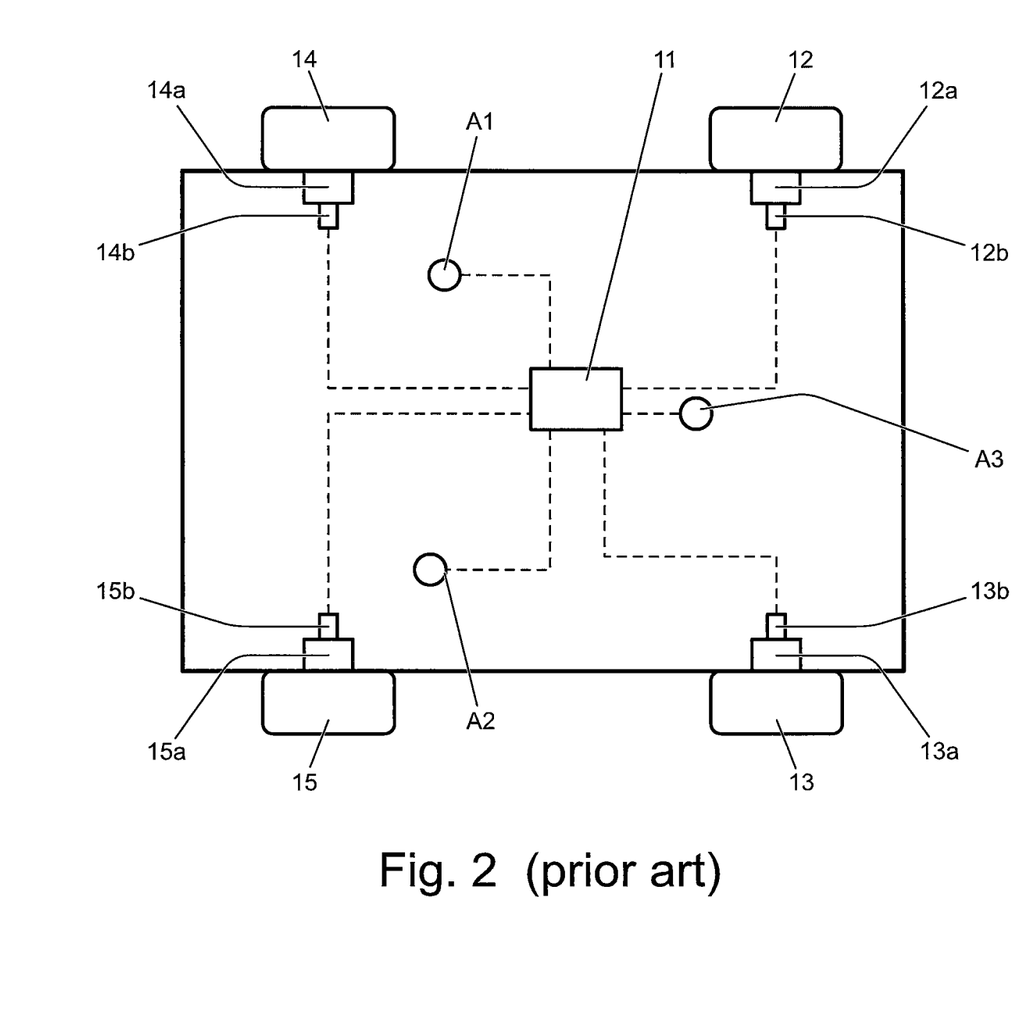
FIG. 2 is a schematic illustration of a prior art vehicle in plan view.

In the prior art vehicle illustrated in FIG. 2, the vehicle 10 has a Vehicle Control Unit ("VCU") 11, where the VCU 10 is configured to implement a surface roughness estimator (or surface roughness estimator function) in order to generate a value of terrain surface roughness. The value of terrain surface roughness may be employed by the VCU 10 in a known manner when in the automatic driving mode selection condition, to determine the most appropriate one of the control modes for vehicle operation. The terrain surface roughness value is also employed by a LSP control system as discussed below in a known manner to determine an appropriate maximum speed of travel over terrain at a given moment in time, and to limit vehicle speed accordingly. The vehicle 10 has front wheels 12, 13 and rear wheels 14, 15. A suspension element 12a, 13a, 14a, 15a connects each wheel to the body of the vehicle and allows for movement of the wheel relative to the body in known manner. Each suspension element has an associated wheel articulation sensor 12b, 13b, 14b, 15b which provides a signal indicative of the position of the wheel with respect to a range of travel of the suspension element associated with that wheel. The suspension elements 12a, 13a, 14a, 15a may for example be controllable elements of an air suspension system.

The vehicle 10 further comprises a plurality of accelerometers, which are shown in dashed outline in FIG. 2 at A1, A2, A3, at spaced apart locations in a triangular arrangement. The accelerometers A1, A2, A3 output signals indicative of vertical acceleration of the vehicle 10 at their respective location. Signals from each of the wheel articulation sensors 12b, 13b, 14b, 15b and accelerometers A1, A2, A3 are received by the VCU 11 as illustrated by the dashed lines.

Conventionally, a terrain surface roughness value is calculated by taking the average of three surface roughness index values. The three surface roughness index values are: a roughness index (RI) value RI_1, providing a measure of roll acceleration, i.e. changes in the angular velocity about the Z-axis; a second RI value RI_2, providing a measure of pitch acceleration, i.e. changes in the angular velocity of the vehicle about the X-axis; and a third RI value RI_3, providing a value correlated with wheel cross-articulation.

In some known vehicles, the surface roughness index values RI_1 and RI_2 are calculated by reference to signals generated by the triad of vertical accelerometers. Surface roughness index value RI_1 may be calculated as the difference in vertical acceleration measured by sensors A1 and A2, whilst index value RI_2 may be calculated as the difference between the value of the average of vertical acceleration values measured by A1 and A2, and the value of vertical acceleration measured by A3.

The index value RI_3 is derived by obtaining a 'measure' of wheel cross-articulation. By cross-articulation is meant a measure of the displacement, with respect to one another, of diagonally opposite wheels at a given moment in time. If diagonally opposite wheels are at the same level of displacement with respect to the range of travel of a portion of the suspension element 111a, 112a, 114a, 115a associated with a given wheel 111, 112, 114, 115, then the vehicle 100 may be said to be in a state of zero cross-articulation with respect to that diagonal pair. Such a state is typical of driving on a relatively smooth road such as a motorway or highway. In contrast, if one wheel is at full droop and a diagonally opposite wheel is at full travel in an upward direction, the vehicle 100 may be said to be in a state of highest cross-articulation with respect to that diagonal pair. A state of high cross articulation can occur for example in the case that one wheel is not in contact with ground (and therefore at full droop) whilst the diagonally opposite wheel is in full contact with ground.

Figure 3:
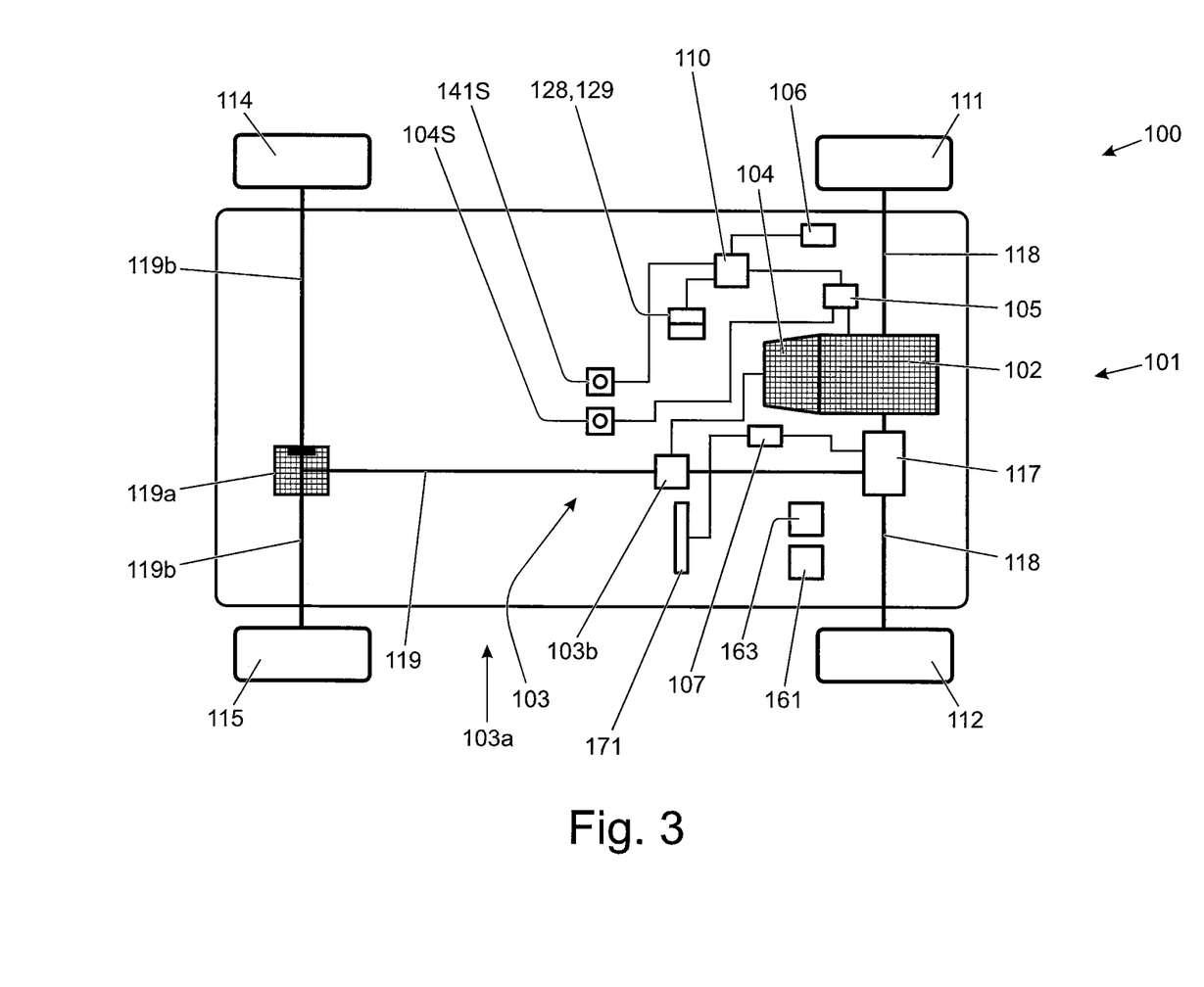
FIG. 3 is a schematic illustration of a vehicle according to an embodiment of the invention in plan view.

FIG. 3 shows a vehicle 100 according to an embodiment of the present invention. The vehicle 100 has a powertrain 101 that includes an engine 102 that is connected to a driveline 103 having an automatic transmission 104. It is to be understood that embodiments of the present invention are also suitable for use in vehicles with manual transmissions, continuously variable transmissions or any other suitable transmission.

In the embodiment of FIG. 1 the transmission 104 may be set to one of a plurality of transmission operating modes, being a park mode, a reverse mode, a neutral mode, a drive mode or a sport mode, by means of a transmission mode selector dial 104S. The selector dial 104S provides an output signal to a powertrain controller 105 in response to which the powertrain controller 105 causes the transmission 104 to operate in accordance with the selected transmission mode.

The driveline 103 is arranged to drive a pair of front vehicle wheels 111,112 by means of a front differential 117 and a pair of front drive shafts 118. The driveline 103 also comprises an auxiliary driveline portion 103a arranged to drive a pair of rear wheels 114, 115 by means of an auxiliary driveshaft or prop-shaft 119, a rear differential 119a and a pair of rear driveshafts 119b.

Embodiments of the invention are suitable for use with vehicles in which the transmission is arranged to drive only a pair of front wheels or only a pair of rear wheels (i.e. front wheel drive vehicles or rear wheel drive vehicles) or selectable two wheel drive/four wheel drive vehicles. In the embodiment of FIG. 1 the transmission 104 is releasably connectable to the auxiliary driveline portion 103a by means of a power transfer unit (PTU) 103b, allowing operation in a two wheel drive mode or a four wheel drive mode. It is to be understood that embodiments of the invention may be suitable for vehicles having more than four wheels or where only two wheels are driven, for example two wheels of a three wheeled vehicle or four wheeled vehicle or a vehicle with more than four wheels.

Figure 4:
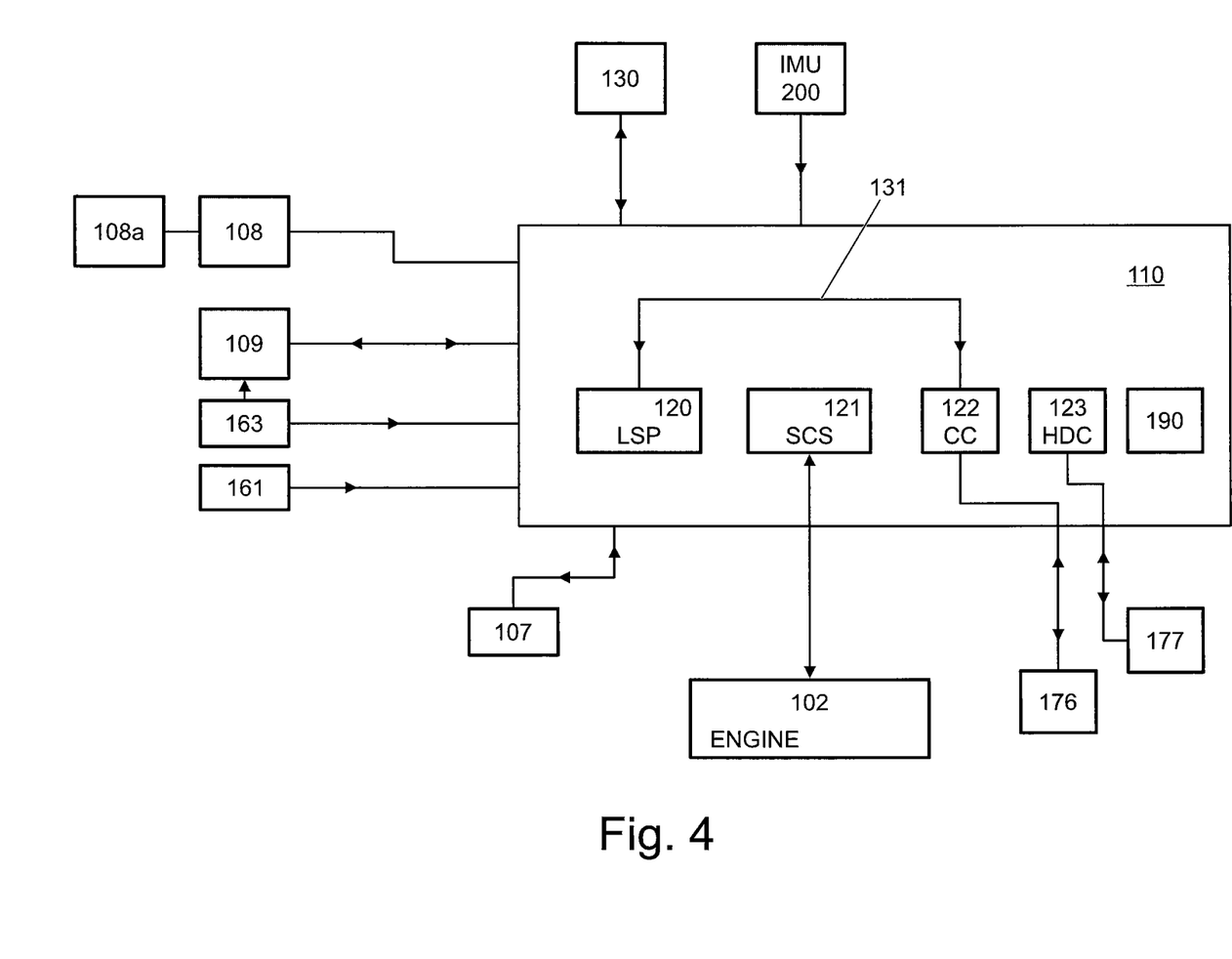
FIG. 4 is a schematic illustration of a portion of a control system of the vehicle of FIG. 1.

A control system for the vehicle includes a central controller 110, referred to as a vehicle control unit (VCU) 110, the powertrain controller 105, a brake controller 106 (an anti-lock braking system (ABS) controller), a steering controller 107 and a suspension system controller 108. The ABS controller 106 forms part of a braking system 109 (FIG. 4). The VCU 110 receives and outputs a plurality of signals to and from various sensors and subsystems (not shown) provided on the vehicle. The VCU 110 includes a low-speed progress (LSP) control system 120 shown in FIG. 4, a stability control system (SCS) 121, a cruise control system 122 and a hill descent control (HDC) system 123. The SCS 121 improves the safety of the vehicle 100 by detecting and managing loss of traction or steering control. When a reduction in traction or steering control is detected, the SCS 121 is operable automatically to command the ABS controller 106 to apply one or more brakes of the vehicle to help to steer the vehicle 100 in the direction the user wishes to travel. In the embodiment shown the SCS 121 is implemented by the VCU 110. In some alternative embodiments the SCS 121 may be implemented by the ABS controller 106.

Although not shown in detail in FIG. 4, the VCU 10 further includes a Traction Control (TC) function block. The TC function block is implemented in software code run by a computing device of the VCU 110. The ABS controller 106 and TC function block provide outputs indicative of, for example, TC activity, ABS activity, brake interventions on individual wheels and engine torque requests from the VCU 110 to the engine 102 in the event a wheel slip event occurs. Each of the aforementioned events indicate that a wheel slip event has occurred. In some embodiments the ABS controller 106 implements the TC function block. Other vehicle sub-systems such as a roll stability control system or the like may also be included.

Figure 5:
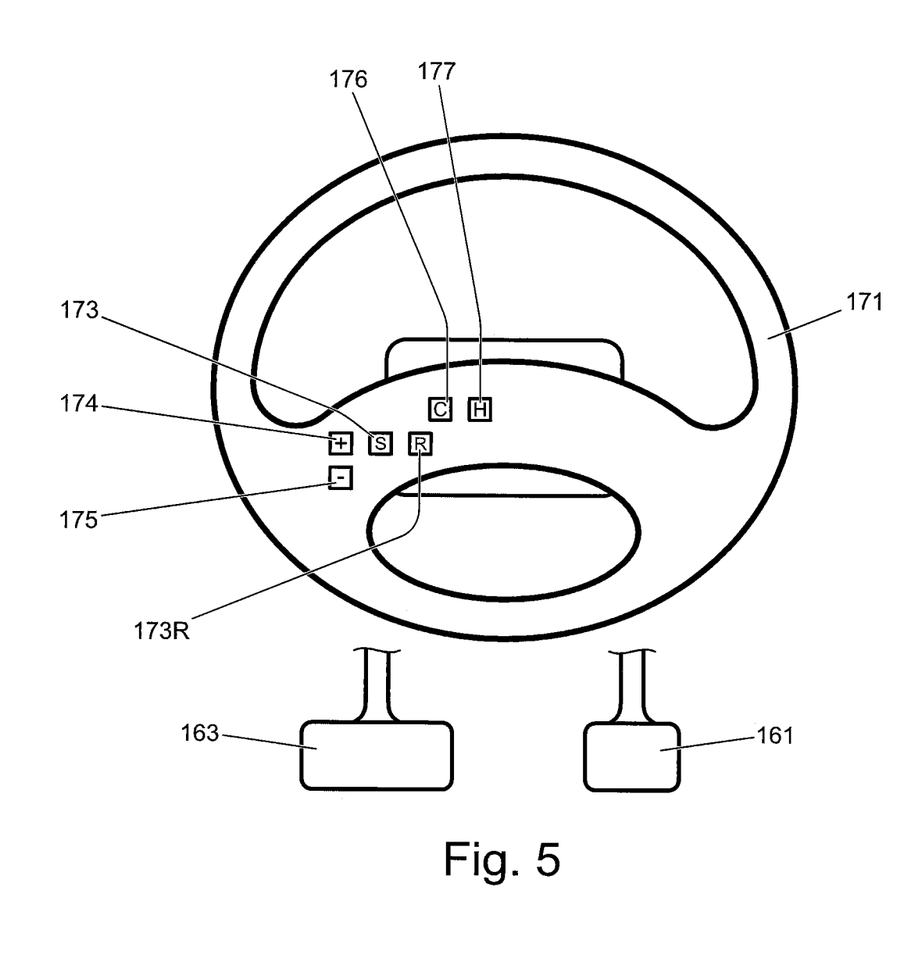
FIG. 5 is a schematic illustration of a steering wheel and pedals of the vehicle of FIG. 1.

As noted above the vehicle 100 also includes a cruise control system 122 which is operable to automatically maintain vehicle speed at a selected speed when the vehicle is travelling at speeds in excess of 25 kph. The cruise control system 122 is provided with a cruise control HMI (human machine interface) 128 by which means the user can input a target vehicle speed to the cruise control system 122 in a known manner. In one embodiment of the invention, cruise control system input controls are mounted to a steering wheel 171 (FIG. 5). The cruise control system 122 may be switched on by pressing a cruise control system selector button 176. When the cruise control system 16 is switched on, depression of a 'set-speed' control 173 sets the current value of a cruise control set-speed parameter, cruise_set-speed to the current vehicle speed. Depression of a '+' button 174 allows the value of cruise_set-speed to be increased whilst depression of a '−' button 175 allows the value of cruise_set-speed to be decreased. A resume button 173R is provided that is operable to control the cruise control system 122 to resume speed control at the instant value of cruise_set-speed following driver over-ride. It is to be understood that known on-highway cruise control systems including the present system 122 are configured so that, in the event that the user depresses the brake or, in the case of vehicles with a manual transmission, a clutch pedal, control of vehicle speed by the cruise control system 122 is cancelled and the vehicle 100 reverts to a manual mode of operation which requires accelerator or brake pedal input by a user in order to maintain vehicle speed. In addition, detection of a wheel slip event, as may be initiated by a loss of traction, also has the effect of cancelling control of vehicle speed by the cruise control system 122. Speed control by the system 122 is resumed if the driver subsequently depresses the resume button 173R.

The cruise control system 122 monitors vehicle speed and any deviation from the target vehicle speed is adjusted automatically so that the vehicle speed is maintained at a substantially constant value, typically in excess of 25 kph. In other words, the cruise control system is ineffective at speeds lower than 25 kph. The cruise control HMI 128 may also be configured to provide an alert to the user about the status of the cruise control system 122 via a visual display of the HMI 128. In the present embodiment the cruise control system 122 is configured to allow the value of cruise_set-speed to be set to any value in the range 25-150 kph.

The LSP control system 120 also provides a speed-based control system for the user which enables the user to select a very low target speed at which the vehicle can progress without any pedal inputs being required by the user to maintain vehicle speed. Low-speed speed control (or progress control) functionality is not provided by the on-highway cruise control system 122 which operates only at speeds above 25 kph.

In the present embodiment, the LSP control system 120 is activated by pressing LSP control system selector button 178 mounted on steering wheel 171. The system 120 is operable to apply selective powertrain, traction control and braking actions to one or more wheels of the vehicle 100, collectively or individually.

The LSP control system 120 is configured to allow a user to input a desired value of vehicle target speed in the form of a set-speed parameter, user_set-speed, via a low-speed progress control HMI (LSP HMI) 129 (FIG. 1, FIG. 3) which shares certain input buttons 173-175 with the cruise control system 122 and HDC control system 123. Provided the vehicle speed is within the allowable range of operation of the LSP control system 120 (which is the range from 2 to 30 kph in the present embodiment although other ranges are also useful) and no other constraint on vehicle speed exists whilst under the control of the LSP control system 120, the LSP control system 120 controls vehicle speed in accordance with a LSP control system set-speed value LSP_set-speed which is set substantially equal to user_set-speed. Unlike the cruise control system 16, the LSP control system 120 is configured to operate independently of the occurrence of a traction event. That is, the LSP control system 120 does not cancel speed control upon detection of wheel slip. Rather, the LSP control system 120 actively manages vehicle behaviour when slip is detected.

The LSP control HMI 129 is provided in the vehicle cabin so as to be readily accessible to the user. The user of the vehicle 100 is able to input to the LSP control system 120, via the LSP HMI 129, the desired value of user_set-speed as noted above by means of the 'set-speed' button 173 and the '+'/'−' buttons 174, 175 in a similar manner to the cruise control system 122. The LSP HMI 129 also includes a visual display by means of which information and guidance can be provided to the user about the status of the LSP control system 120.

The LSP control system 120 receives an input from the ABS controller 106 of the braking system 109 of the vehicle indicative of the extent to which the user has applied braking by means of the brake pedal 163. The LSP control system 120 also receives an input from an accelerator pedal 161 indicative of the extent to which the user has depressed the accelerator pedal 161, and an input from the transmission or gearbox 104. This latter input may include signals representative of, for example, the speed of an output shaft of the gearbox 104, an amount of torque converter slip and a gear ratio request. Other inputs to the LSP control system 120 include an input from the cruise control HMI 128 which is representative of the status (ON/OFF) of the cruise control system 122, an input from the LSP control HMI 129, and an input from a gradient sensor 130 indicative of the gradient of the driving surface over which the vehicle 100 is driving. In the present embodiment the gradient sensor 130 is a gyroscopic sensor. In some alternative embodiments the LSP control system 120 receives a signal indicative of driving surface gradient from another controller such as the ABS controller 106. The ABS controller 106 may determine gradient based on a plurality of inputs, optionally based at least in part on signals indicative of vehicle longitudinal and lateral acceleration and a signal indicative of vehicle reference speed (v_actual) being a signal indicative of actual vehicle speed over ground. Methods for the calculation of vehicle reference speed based for example on vehicle wheel speeds are well known. For example in some known vehicles the vehicle reference speed may be determined to be the speed of the second slowest turning wheel, or the average speed of all the wheels. Other ways of calculating vehicle reference speed may be useful in some embodiments, including by means of a camera device or radar sensor.

The HDC system 123 is activated by depressing button 177 comprised by HDC system HMI and mounted on the steering wheel 171. When the HDC system 123 is active, the system 123 controls the braking system 109 in order to limit vehicle speed to a value corresponding to that of a HDC set-speed parameter HDC_set-speed which may be controlled by a user in a similar manner to the set-speed of the cruise control system 122 and LSP control system, using the same control buttons 173, 173R, 174, 175. The HDC system 123 is operable to allow the value of HDC_set-speed to be set to any value in the range from 2-30 kph. The HDC set-speed parameter may also be referred to as an HDC target speed. Provided the user does not override the HDC system 123 by depressing the accelerator pedal 161 when the HDC system 12HD is active, the HDC system 123 controls the braking system 109 (FIG. 3) to prevent vehicle speed from exceeding HDC_set-speed. In the present embodiment the HDC system 123 is not operable to apply positive drive torque. Rather, the HDC system 123 is only operable to cause negative brake torque to be applied, via the braking system 109.

It is to be understood that the VCU 110 is configured to implement a known Terrain Response (TR)® System of the kind described above in which the VCU 110 controls settings of one or more vehicle systems or sub-systems including the powertrain controller 11 in dependence on a selected driving mode. The driving mode may be selected by a user by means of a driving mode selector 141S (FIG. 1). The driving modes may also be referred to as terrain modes, terrain response (TR) modes, or control modes. Further sub-systems under the control of the TR system include the suspension system controller 108, the SCS system 121 and steering controller 107. The suspension controller 108 is configured to control an air suspension system 108a (FIG. 4) to allow vehicle ride height to be set to one of four settings corresponding to different heights of the vehicle 100 above level ground. In each driving mode, the VCU 110 sets the value of ride height of the vehicle to a predetermined value associated with the selected driving mode.

In the embodiment of FIG. 1 five driving modes are provided: an 'on-highway' driving mode suitable for driving on a relatively hard, smooth driving surface where a relatively high surface coefficient of friction exists between the driving surface and wheels of the vehicle; a 'sand' driving mode suitable for driving over sandy terrain, being terrain characterised at least in part by relatively high drag, relatively high deformability or compliance and relatively low surface coefficient of friction; a 'grass, gravel or snow' (GGS) driving mode suitable for driving over grass, gravel or snow, being relatively slippery surfaces (i.e. having a relatively low coefficient of friction between surface and wheel and, typically, lower drag than sand); a 'rock crawl' (RC) driving mode suitable for driving slowly over a rocky surface; and a 'mud and ruts' (MR) driving mode suitable for driving in muddy, rutted terrain. Other driving modes may be provided in addition or instead. In the present embodiment the selector 141S also allows a user to select an 'automatic driving mode selection condition' of operation in which the VCU 10 selects automatically the most appropriate driving mode as described in more detail below. The on-highway driving mode may be referred to as a 'special programs off' (SPO) mode in some embodiments since it corresponds to a standard or default driving mode, and is not required to take account of special factors such as relatively low surface coefficient of friction, or surfaces of high roughness.

The LSP control system 120 causes the vehicle 100 to operate in accordance with the value of LSP_set-speed.

In order to cause application of the necessary positive or negative torque to the wheels, the VCU 110 may command that positive or negative torque is applied to the vehicle wheels by the powertrain 101 and/or that a braking force is applied to the vehicle wheels by the braking system 109, either or both of which may be used to implement the change in torque that is necessary to attain and maintain a required vehicle speed. In some embodiments torque is applied to the vehicle wheels individually, for example by powertrain torque vectoring, so as to maintain the vehicle at the required speed. Alternatively, in some embodiments torque may be applied to the wheels collectively to maintain the required speed, for example in vehicles having drivelines where torque vectoring is not possible. In some embodiments, the powertrain controller 105 may be operable to implement torque vectoring to control an amount of torque applied to one or more wheels by controlling a driveline component such as a rear drive unit, front drive unit, differential or any other suitable component. For example, one or more components of the driveline 103 may include one or more clutches operable to allow an amount of torque applied to one or more wheels to be varied. Other arrangements may also be useful.

Where a powertrain 101 includes one or more electric machines, for example one or more propulsion motors and/or generators, the powertrain controller 11 may be operable to modulate torque applied to one or more wheels in order to implement torque vectoring by means of one or more electric machines.

In some embodiments the LSP control system 120 may receive a wheel_slip signal 131 indicative of a wheel slip event having occurred. This signal 131 is also supplied to the on-highway cruise control system 122 of the vehicle, and which in the case of the latter triggers an override or inhibit mode of operation in the on-highway cruise control system 122 so that automatic control of vehicle speed by the on-highway cruise control system 122 is suspended or cancelled. However, the LSP control system 120 is not arranged to cancel or suspend operation on receipt of wheel_slip signal 131. Rather, the system 120 is arranged to monitor and subsequently manage wheel slip so as to reduce driver workload. During a slip event, the LSP control system 120 continues to compare the measured vehicle speed with the value of LSP_set-speed, and continues to control automatically the torque applied to the vehicle wheels (by the powertrain 101 and braking system 109) so as to maintain vehicle speed at the selected value. It is to be understood therefore that the LSP control system 120 is configured differently to the cruise control system 122, for which a wheel slip event has the effect of overriding the cruise control function so that manual operation of the vehicle must be resumed, or speed control by the cruise control system 122 resumed by pressing the resume button 173R or set-speed button 173.

The vehicle 100 is also provided with additional sensors (not shown) which are representative of a variety of different parameters associated with vehicle motion and status. These may be inertial systems unique to the LSP or HDC control systems 120, 123 or part of an occupant restraint system or any other sub-system which may provide data from sensors such as gyros and/or accelerometers that may be indicative of vehicle body movement and may provide a useful input to the LSP and/or HDC control systems 120, 123. The signals from the sensors provide, or are used to calculate, a plurality of driving condition indicators (also referred to as terrain indicators) which are indicative of the nature of the terrain conditions over which the vehicle 100 is travelling.

The sensors (not shown) on the vehicle 100 include, but are not limited to, sensors which provide continuous sensor outputs to the VCU 10, including wheel speed sensors, as mentioned previously, an ambient temperature sensor, an atmospheric pressure sensor, tyre pressure sensors, an engine torque sensor (or engine torque estimator), a steering angle sensor, a steering wheel speed sensor, a brake pedal position sensor, a brake pressure sensor, an accelerator pedal position sensor, and water detection sensors forming part of a vehicle wading assistance system (not shown). In other embodiments, only a selection of the aforementioned sensors may be used.

The vehicle has an inertial measurement unit (IMU) 200 configured to output to the VCU 10 signals indicative of longitudinal, lateral and vertical acceleration, and of yaw rate, a pitch rate and roll rate.

The VCU 110 also receives a signal from the steering controller 107. The steering controller 107 is in the form of an electronic power assisted steering unit (ePAS unit). The steering controller 107 provides a signal to the VCU 110 indicative of the steering force being applied to steerable road wheels 111, 112 of the vehicle 100. This force corresponds to that applied by a user to the steering wheel 171 in combination with steering force generated by the ePAS unit 107. The ePAS unit also provides a signal indicative of steering wheel rotational position or angle.

In the present embodiment, the VCU 110 evaluates the various sensor inputs to determine the probability that each of the plurality of different TR modes (control modes or driving modes) for the vehicle subsystems is appropriate, with each control mode corresponding to a particular terrain type over which the vehicle is travelling (for example, mud and ruts, sand, grass/gravel/snow) as described above.

If the user has selected operation of the vehicle in the automatic driving mode selection condition, the VCU 110 then selects the most appropriate one of the control modes and is configured automatically to control the subsystems according to the selected mode. This aspect of the invention is described in further detail in our co-pending patent applications GB2492748, GB2492655 and GB2499279, the contents of each of which is incorporated herein by reference as noted above.

As indicated above, the nature of the terrain over which the vehicle is travelling (as determined by reference to the selected control mode) may also be utilised in the LSP control system 120 to determine an appropriate increase or decrease in vehicle speed. For example, if the user selects a value of user_set-speed that is not suitable for the nature of the terrain over which the vehicle is travelling, the system 120 is operable to automatically adjust the value of LSP_set-speed to a value lower than user_set-speed. In some cases, for example, the user selected speed may not be achievable or appropriate over certain terrain types, particularly in the case of uneven or rough surfaces. If the system 120 selects a set-speed (a value of LSP_set-speed) that differs from the user-selected set-speed user_set-speed, a visual indication of the speed constraint is provided to the user via the LSP HMI 129 to indicate that an alternative speed has been adopted. Other arrangements may be useful.

In the embodiment of FIG. 3, the sensors and accelerometers of FIG. 2 are omitted. Instead, a surface roughness estimator 190 is configured to employ signals output by the IMU 200 to generate the three RI values RI_1, RI_2, RI_3. It is to be understood that the IMU 200 outputs signals indicative of longitudinal, vertical and lateral acceleration together with signals indicative of vehicle roll rate and vehicle pitch rate. The signal indicative of vehicle roll rate therefore corresponds to parameter RI_1 employed by the VCU 110 whilst the signal indicative of pitch rate corresponds to parameter RI_2. In the example of FIG. 4, the surface roughness estimator 190 is provided as a module or other part of the VCU 110, but it will be apparent that the surface roughness estimator 190 may be provided or located in any other suitable part of the vehicle or its control system.

In the present embodiment, it has been further found that a value for parameter RI_3 can be calculated in dependence on acceleration values along two of the axes of the vehicle, as output by the IMU 200. Where transient spikes in acceleration along the two axes of the vehicle are coincident or overlap in time, this provides a quantifiable indication of the roughness of a surface. The values of vertical and lateral acceleration associated with travel over uneven terrain typically increase with increasing vehicle speed and the parameter value is modified on the basis of the vehicle speed.

Figure 6:
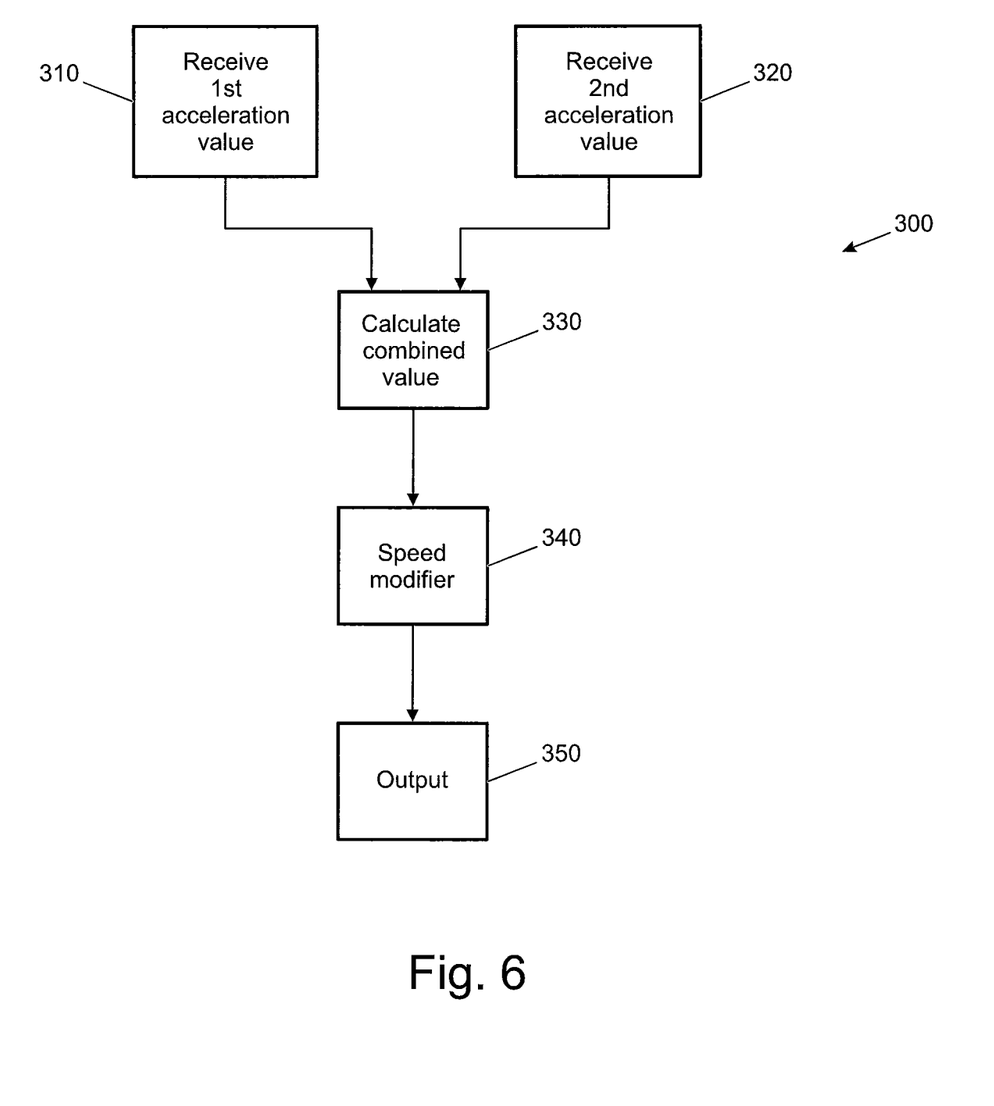
FIG. 6 is a flow chart showing a first method according to an embodiment of the invention.

A method of determining a parameter RI_3, in this example as carried out by surface roughness estimator 190, is illustrated at 300 in FIG. 6. At steps 310 and 320, acceleration values for the vertical and lateral acceleration are received, and at step 330 a combined value is generated. In this example, the combined value is the product of the absolute value of each acceleration value, although the sum of the values or some other measure of correlation may be used.

At step 340, the combined value is moderated with respect to vehicle speed. In the present embodiment, the value of the combined value is multiplied by a factor that is speed dependent, being higher at lower speed and lower at higher speeds. The value of the factor in this example is determined by reference to a look-up table, which may for example be vehicle-specific. At step 350, an output signal comprised the resulting roughness value for parameter RI_3 is generated and may be output for further systems elements to use, or may be combined with RI_1 and RI_2 to generate a roughness index which is then output.

It is to be understood that, when travelling at a relatively low speed, for example below 5 kph, the IMU 200 may not provide acceleration values that are sufficiently accurate or reliable to enable a value for the roughness parameter to be calculated. It is however desirable to detect that a rough surface at low speeds has been encountered so that the VCU 110 may control the vehicle 100 accordingly, for example by selecting a rock crawl driving mode.

Accordingly, the surface roughness estimator 190 is configured to implement a low speed roughness estimation algorithm and to generate a signal providing an estimate of terrain surface roughness when certain conditions are met, including the condition that vehicle speed is below threshold speed. In the present embodiment the threshold speed is 5 kph. Other values may be useful in some alternative embodiments.

Figure 7:
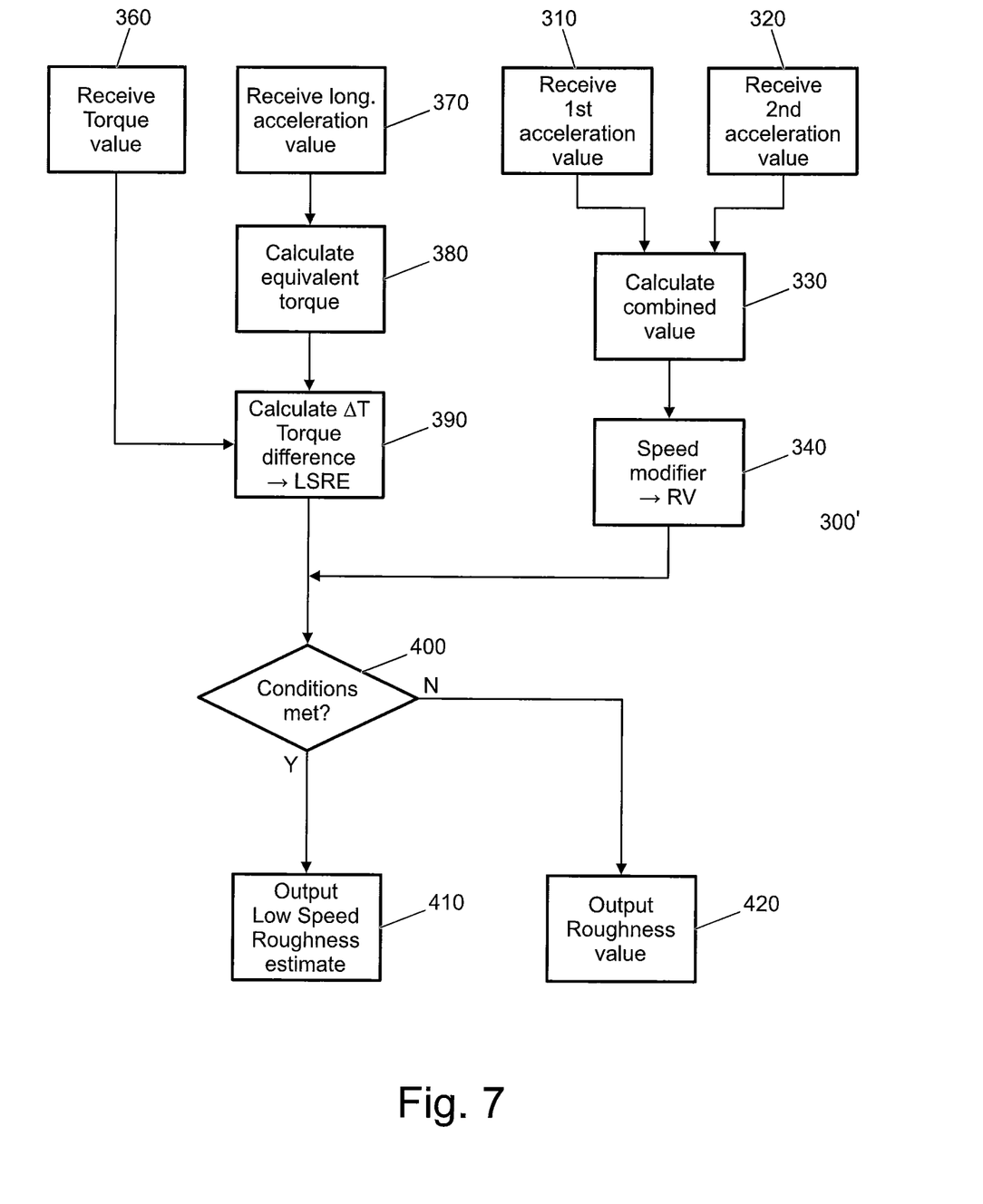
FIG. 7 is a flow chart showing a second method according to an embodiment of the invention.

A method incorporating a low speed roughness estimation algorithm is illustrated at 300' in FIG. 7. In FIG. 7, steps 310, 320, 330 and 340 are the same as those shown in FIG. 6 above. In addition, at step 360 the method includes receiving an axle torque value showing the amount of torque being applied to at least one driven axle or driven wheel of the vehicle and, at step 370, receive a value for the longitudinal acceleration of the vehicle.

At step 380, a torque difference value is calculated. The amount of torque required to achieve the value of longitudinal acceleration in the presence of a smooth driving surface is calculated, and the result subtracted from the amount of drive torque applied to the driven wheels of the vehicle to provide the torque difference value. This step hence determines whether the amount of torque being applied to driving (or driven, i.e. powertrain-driven) wheels of the vehicle 100 to accelerate the vehicle is consistent with the amount of torque required to generate the instant value of longitudinal acceleration of the vehicle, taking into account the pitch attitude of the vehicle 100 (which is assumed to correspond to the gradient of the driving surface). If the amount of torque actually applied is greater than the amount that would be required to achieve the instant value of vehicle longitudinal acceleration (which may for example be due to one or more wheels encountering steps or ridges in terrain height), indicating rough terrain without relying on lateral or vertical acceleration values.

At step 400, one or more predetermined conditions is checked to determine whether the low speed roughness estimate should be used. In the present embodiment, the low speed roughness estimation algorithm generates an estimate of surface roughness when the following conditions are met:
(a) vehicle speed is below a threshold speed value, in the present embodiment 5 kph;
(b) the vehicle 100 is operating with the transmission in a gear number that is less or equal to a threshold gear number, in the present embodiment the threshold gear number is two;
(c) the amount of torque being applied to at least one driving axle of the vehicle is greater than a threshold axle torque value, in the present embodiment around 30 Nm; and
(d) vehicle longitudinal acceleration is greater than a threshold longitudinal acceleration value (in the present embodiment, longitudinal acceleration is required to be greater than zero).

If the predetermined conditions are met, then at step 410 a signal comprising the low speed roughness estimate is passed, otherwise, as shown at step 420, the roughness value from step 340 is passed.

Figure 8:
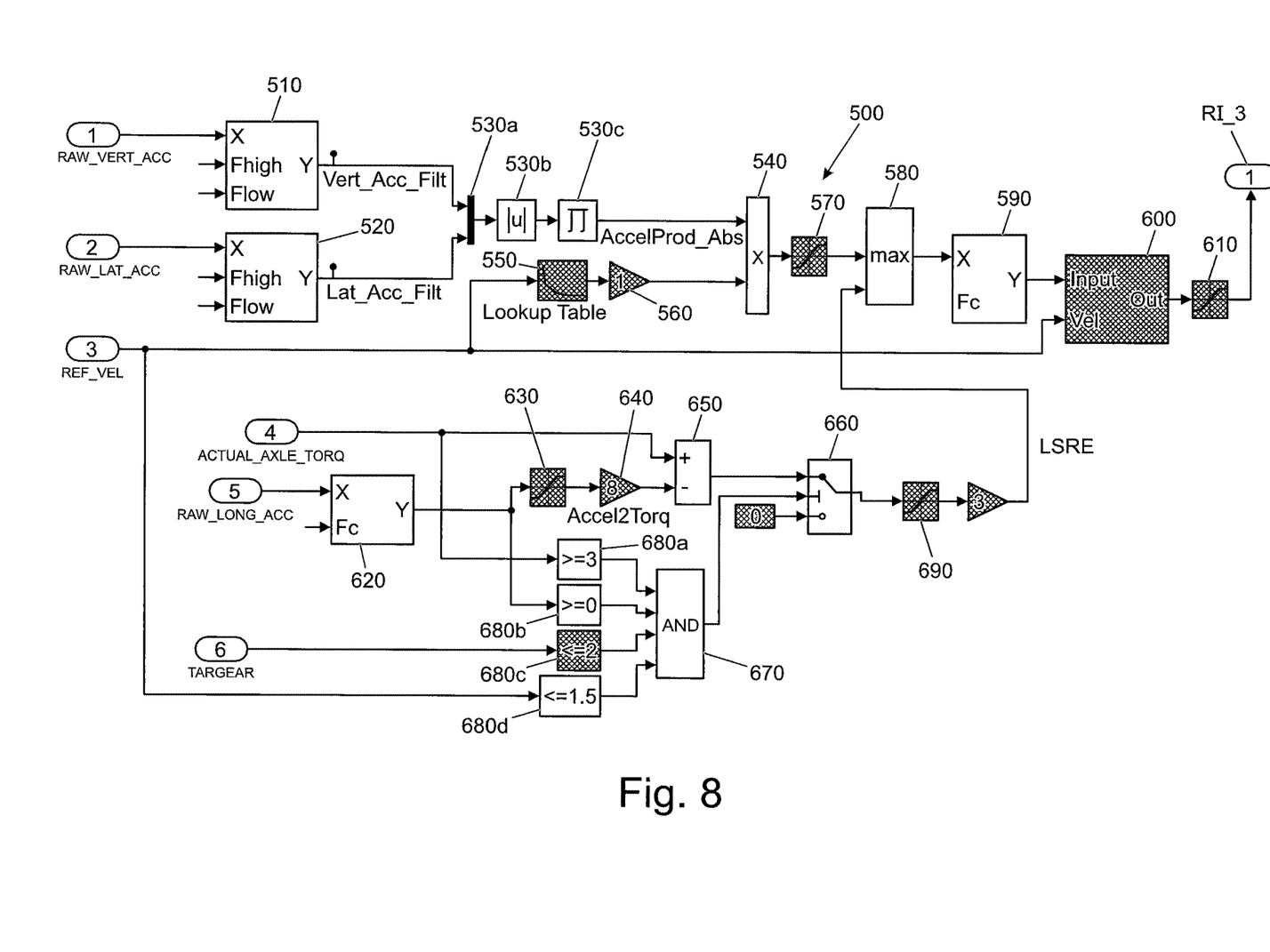
FIG. 8 is a more detailed diagram illustrating operation of an example surface roughness estimator according to an embodiment of the invention.

FIG. 8 is a diagram illustrating a particular embodiment in more detail of the method of FIG. 7. This example method, shown at 500, is a computer implemented method executed by running executable program code on a suitable processor such as a vehicle's on board computer. The processor may be referred to as a system throughout this example.

Vertical and lateral acceleration signals RAW_VERT_ACC, RAW_LAT_ACC are input to respective band pass filter function blocks 510, 520 that allow values of the respective signals falling within the range of upper and lower limits Fhigh, Flow, respectively, to pass through the function blocks 510, 520. In the embodiment illustrated the values of Fhigh and Flow have been set to 3 Hz and 0.2 Hz, respectively. The upper filter limit is set to exclude high frequency noise from the accelerometers of the IMU 200, while the lower filter limit is chosen to extend the time period of transient peaks in the signal to increase the overlap of coincident signals for two axes of acceleration.

The band pass filter function blocks 510, 520 in turn output the filtered acceleration signals to a function blocks 530a, 530b and 530c which multiplexes the two signals, takes the absolute value of each and then multiplies the two absolute values to generate a signal AccelProd_Abs, the combined value as identified above. The signal AccelProd_Abs is output to a multiplier function block 540.

A signal REF_VEL being a reference speed signal indicative of the current speed of the vehicle 100 over terrain is fed to a lookup-table function block 550. It is to be understood that calculation of a reference speed signal is well known, and may for example be determined to be the speed of the second slowest turning wheel, as measured by wheel speed sensors. The lookup-table function block 550 applies the signal REF_VEL to a lookup-table and outputs to a gain function block 560 a factor corresponding to the signal REF_VEL. Gain function block 560 applies a predetermined gain to the factor in order to generate a speed normalisation factor.

Gain function block 560 outputs the speed normalisation factor to multiplier function block 540 which multiples the signal AccelProd_Abs by the speed normalisation factor.

The purpose of this feature is to enable the signal AccelProd_Abs to be adjusted as a function of speed in order to obtain a signal indicative of terrain surface roughness. For a given terrain surface roughness, vehicle vertical and lateral acceleration (on which the terrain roughness measurement is based) as the vehicle traverses the terrain are typically speed dependent, being lower at low speeds. The normalisation factor may also need to be vehicle-dependent, as different types of vehicle will have different responses at different frequencies, but in general a higher gain is required at lower speeds. The speed normalisation factor may for example be an inverse quadratic function. It will be apparent that blocks 510 to 570 are an implementation of steps 310 to 340 of the method of FIG. 6.

The multiplier function block 540 outputs the normalised cross-acceleration signal to a saturation function block 570 that limits the range of values of roughness that may be output to a predetermined range.

The output of the saturation function block 570 is input to a maximiser function block 580 that also receives a signal LSRE indicative of a low speed roughness estimate calculated by the surface roughness estimator 190 as discussed below. The signal LSRE is generated when certain conditions are met and provides an indication of terrain roughness when those conditions are met. The maximiser function block 580 outputs the higher of the two input signals to low pass filter function block 590. In the present example, as discussed below the signal LSRE will be set to zero unless the conditions for use of a non-zero signal low speed roughness estimate are met, including the requirement that vehicle speed is less than a critical value (in the present embodiment 5 kph), Low pass filter function block 590 subjects the signal input thereto to a low pass filter function. The low pass filter function has a cut off frequency of 0.08 Hz in the embodiment shown, although other values may be useful in some alternative embodiments.

The low pass filter function block 590 provides an output to a signal hold function block 600. The signal hold function block also receives reference speed signal REF_VEL. The signal hold function block 600 outputs to saturation function block 610 the value of the signal input to the signal hold function block 600 by the low pass filter function block 590 provided the value of REF_VEL is above a freeze threshold, in this example 0.5 m/s. In the event that the value of REF_VEL falls below 0.5 m/s, the signal hold function block 600 freezes the signal it outputs until the value of REF_VEL is again 0.5 m/s or higher.

Saturation function block 610 in turn outputs the signal input thereto from the signal hold function block 600 but limits the range of values of the signal to an acceptable or desirable range. The resulting value is then output, in this example directly as RI_3.

The implementation by the surface roughness estimator 190 of the low speed roughness estimation algorithm will now be described by reference to the lower portion of FIG. 8.

Low pass filter function block 620 is configured to receive signal RAW_LONG_ACC comprising a value corresponding to the longitudinal acceleration of the vehicle and output a low pass filtered value. The low pass filter function block 620 has a cut off frequency of 5 Hz in the embodiment shown although other values may be useful in some embodiments. The low pass filtered value of RAW_LONG_ACC is output to a saturation function block 630 and in addition a logic function block 680b. Saturation function block 630 is configured to output the value of filtered signal input thereto but to limit the range of values output to a predetermined range of values. In the present embodiment, the maximum value of forward acceleration is around 2 g, so the output values are limited to the range 0-20 m/s2. An appropriate range of values may be determined by the skilled person for a given vehicle.

The output of the saturation function block 630 is provided to a gain function block 640. The amount of gain provided by the gain function block 640 is dependent on the gear in which the vehicle transmission is currently operating, in order that the output of the gain function block 640 is proportional to the amount of torque required to cause an amount of acceleration corresponding to the value of the signal output by the saturation function bock 640, assuming the vehicle 100 to be on substantially level ground with no obstacles (such as steps) in the path of the vehicle.

It is to be understood that, in some alternative embodiments, the gain function block 640 may take into account the gradient of the terrain over which the vehicle 100 is travelling when calculating the amount of gain to apply to the signal, in order to generate an output that corresponds to the amount of torque required to cause the prevailing longitudinal acceleration. The gradient of the terrain may be determined by reference to the instant value of pitch attitude of the vehicle 100 or by any other suitable means.

The output of the gain function block 640 is provided to a subtraction function block 650. The subtraction function block 650 subtracts the value of the signal output by the gain function block 640 from the value of a signal ACTUAL_AXLE_TORQUE that is indicative of the actual amount of powertrain torque being applied to the one or more driven axles of the vehicle 100. It is to be understood that the value of ACTUAL_AXLE_TORQUE may exceed the amount of torque required to cause the instant acceleration by a non-trivial amount in the event that one or more wheels have encountered a step or ridge in terrain height that the vehicle 100 must climb over. The difference between the signal ACTUAL_AXLE_TORQUE and the value of the signal output by the gain function block 640 is fed to a switch function block 660 that outputs a signal corresponding to the difference between the signal ACTUAL_AXLE_TORQUE and the value of the signal output by the gain function block 640 provided the condition is met that the output from AND function block 670 is high (logical '1') as described below. If the condition is not met, the output of the switch function block 249 is set to zero.

Logical function blocks 680a, 680b, 680c and 680d each provide an output to one of four respective inputs of AND function block 670. The respective outputs of the function blocks 680a, 680b, 680c and 680d are set to output logical '1' if the respective signal input thereto meets a predetermined condition, and logical '0' if it does not.

Function block 680a receives the signal ACTUAL_AXLE_TORQUE and in the present embodiment outputs logical '1' if the condition is met that the value of ACTUAL_AXLE exceeds a critical value of 30 Nm. Other values of critical value of ACTUAL_AXLE_TORQUE may be useful in some embodiments.

Function block 680b receives the signal output by low pass filter function block 620 and in the present embodiment outputs logical '1' if the condition is met that the value of the signal is greater than a critical value of zero. Thus, the output of function block 680ab is set to logical '1' when the vehicle is experiencing forward acceleration, i.e. experiencing an increase in forward speed. Other values of critical value may be useful in some embodiments.

Function block 680c receives a signal TARGEAR indicative of the gear in which the transmission of the vehicle 100 is operating. The function block 680c outputs logical '1' if the condition is met that the value of TARGEAR is less than or equal to a critical gear number of 2, i.e. the transmission is operating in first or second gear. Other values of critical gear number may be useful in some embodiments.

Function block 680d receives the signal REF_VEL. The function block 680d outputs logical '1' if the condition is met that the value of REF_VEL is less than or equal to a critical speed of 5 kph. Other values of critical speed may be useful in some embodiments. In some embodiments the critical speed may be set to around 1.5 m/s.

AND function block 670 performs an AND operation on the outputs of the four function blocks 680a, 680b, 680c and 680d. If each of the outputs received by the AND function block 670 is logical '1', the AND function block outputs a logical '1' signal to the switch function block 660.

The output of the switch function block 660 is provided via saturation function block 690 to gain function block 700 which applies a predetermined gain to the signal input thereto. The output of gain function block 700 is provided as signal LSRE to maximiser function block 580 as described above. It will be apparent that blocks 580 and 620 to 700 are an implementation of steps 360 to 420 of the method of FIG. 7.

Embodiments of the present invention have the advantage that an IMU sensor may be employed to calculate the surface roughness of terrain in a reliable manner, without requiring any additional sensors. Since IMU sensors are relatively common in motor vehicles today, reliable surface roughness information is made accessible and can be used to control a range of vehicle functions including speed control systems and terrain response systems.

It is to be understood that the controller 110 can comprise a control unit or computational device having one or more electronic processors (e.g., a microprocessor, a microcontroller, an application specific integrated circuit (ASIC), etc.), and may comprise a single control unit or computational device, or alternatively different functions of the controller 110 may be embodied in, or hosted in, different control units or computational devices. As used herein, the term "controller," "control unit," or "computational device" will be understood to include a single controller, control unit, or computational device, and a plurality of controllers, control units, or computational devices collectively operating to provide the required control functionality. A set of instructions could be provided which, when executed, cause the controller 110 to implement the control techniques described herein (including some or all of the functionality required for the method described herein). The set of instructions could be embedded in said one or more electronic processors of the controller 110; or alternatively, the set of instructions could be provided as software to be executed in the controller 110. A first controller or control unit may be implemented in software run on one or more processors. One or more other controllers or control units may be implemented in software run on one or more processors, optionally the same one or more processors as the first controller or control unit. Other arrangements are also useful.

In an illustrative embodiment such as that shown in FIG. 4, the controller 110 comprises an electronic processor having one or more electrical and one or more electrical outputs. The electronic processor may comprise any suitable electronic processor (e.g., a microprocessor, a microcontroller, an ASIC, etc.) that is configured to execute electronic instructions. The controller 110 may further include an electronic memory device that is either part of or electrically connected to and accessible by the processor. The electronic memory device may comprise any suitable memory device and may store a variety of data, information, threshold value(s), lookup tables or other data structures, and/or instructions therein or thereon. In an embodiment, the memory device has information and instructions for software, firmware, programs, algorithms, scripts, applications, etc. stored therein or thereon that may govern all or part of the methodology described herein. The processor may access the memory device and execute and/or use that or those instructions and information to carry out or perform some or all of the functionality and methodology describe herein. Alternatively, some or all of the aforementioned instructions/information may be embedded in a computer-readable storage medium (e.g. a non-transitory or non-transient storage medium) that may comprise any mechanism for storing information in a form readable by a machine or electronic processors/computational devices, including, without limitation: a magnetic storage medium (e.g. floppy diskette); optical storage medium (e.g. CD-ROM); magneto optical storage medium; read only memory (ROM); random access memory (RAM); erasable programmable memory (e.g. EPROM ad EEPROM); flash memory; or electrical or other types of medium for storing such information/instructions.

References herein to a block such as a function block are to be understood to include reference to software code for performing the function or action specified which may be an output that is provided responsive to one or more inputs. The code may be in the form of a software routine or function called by a main computer program, or may be code forming part of a flow of code not being a separate routine or function. Reference to function block is made for ease of explanation of the manner of operation of embodiments of the present invention.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A surface roughness estimator for a vehicle configured to generate a first surface roughness index value indicative of terrain surface roughness and to output a signal in dependence at least in part on the first surface roughness index value, the estimator being configured to:
   receive first acceleration information indicative of a first acceleration along a first axis of the vehicle,
   receive second acceleration information indicative of a second acceleration along a second axis of the vehicle,
   calculate a combined value in dependence on the first acceleration and second acceleration, and
   adjust the combined value in dependence on a speed of the vehicle to generate a surface roughness value,
   receive third acceleration information indicative of an acceleration value along a longitudinal axis of the vehicle;
   determine an amount of torque required to achieve an instant value of longitudinal acceleration in the presence of a smooth, step-free driving surface,
   calculate a surface roughness estimate in dependence at least in part on a difference between the amount of drive torque applied to driving wheels of the vehicle and the amount of torque required to achieve the instant value of longitudinal acceleration in the presence of a smooth, step-free driving surface; and generate the first surface roughness index value based on either the surface roughness value or the surface roughness estimate in dependence on a set of one or more conditions being met;

wherein the surface roughness estimator is combined with a motor vehicle controller and the motor vehicle controller is configured to control the vehicle in dependence at least in part on the signal output by the surface roughness estimator.

2. The surface roughness estimator according to claim 1, wherein the first acceleration and the second acceleration comprise two of acceleration along a vertical axis, acceleration along a longitudinal axis and acceleration along a lateral axis of the vehicle.

3. The surface roughness estimator according to claim 1, wherein the first acceleration is lateral acceleration and the second acceleration is vertical acceleration.

4. The surface roughness estimator according to claim 1, wherein the combined value corresponds to a product of the first and second accelerations.

5. The surface roughness estimator according to claim 1, wherein the set of one or more predetermined conditions includes one or more of the following conditions:
the speed of the vehicle is below a predetermined critical speed,
the amount of drive torque applied to driving wheels of the vehicle exceeds a predetermined drive torque amount,
the amount of longitudinal acceleration exceeds a predetermined longitudinal acceleration amount, and
a transmission of the vehicle is in a gear having a number that is less than or equal to a predetermined gear number.

6. The surface roughness estimator according to claim 1, further configured to calculate second and third surface roughness index values in addition to the first surface roughness index value, wherein the second and third surface roughness index values correspond to vehicle roll acceleration and vehicle pitch acceleration.

7. The surface roughness estimator according to claim 6, further configured to calculate a terrain surface roughness value, the terrain surface roughness value being an average of the first, second and third surface roughness index values.

8. A vehicle comprising the surface roughness estimator according to claim 1.

9. A method of generating an estimate of surface roughness for terrain being traversed by a vehicle, comprising generating a first surface roughness index value indicative of terrain surface roughness, the method comprising:
receiving first acceleration information indicative of a first acceleration along a first axis of the vehicle,
receiving second acceleration information indicative of a second acceleration along a second axis of the vehicle,
calculating a combined value in dependence on the first acceleration and second acceleration,
adjusting the combined value in dependence on a speed of the vehicle generate a surface roughness value,
receiving third acceleration information indicative of an acceleration value along a longitudinal axis of the vehicle,
determining an amount of torque required to achieve an instant value of longitudinal acceleration in the presence of a smooth, step-free driving surface;
calculating a surface roughness estimate in dependence at least in part on a difference between the amount of drive torque applied to driving wheels of the vehicle and the amount of torque required to achieve the instant value of longitudinal acceleration in the presence of a smooth, step-free driving surface,
generating the first surface roughness index value based on either the surface roughness value or the surface roughness estimate in dependence on a set of one or more conditions being met, and
outputting a control signal based on the generated first roughness index value by a motor vehicle controller to cause the vehicle to be controlled in dependence at least in part on the first roughness index value.

10. The method according to claim 9, wherein the set of one or more predetermined conditions includes one or more of the following conditions:
the speed of the vehicle is below a predetermined critical speed,
the amount of drive torque applied to driving wheels of the vehicle exceeds a predetermined drive torque amount,
the amount of longitudinal acceleration exceeds a predetermined longitudinal acceleration amount, and
a transmission of the vehicle is in a gear having a number that is less than or equal to a predetermined gear number.

11. The method according to claim 10, wherein the first acceleration and the second acceleration comprise two of vertical acceleration, longitudinal acceleration and lateral acceleration of the vehicle.

12. The method according to claim 10, wherein the first acceleration is lateral acceleration and the second acceleration is vertical acceleration.

13. The method according to claim 10, wherein the combined value corresponds to a product of the first and second accelerations.

14. The method according to claim 10, further comprising calculating second and third surface roughness index values in addition to the first surface roughness index value, wherein the second and third surface roughness index values correspond to vehicle roll acceleration and vehicle pitch acceleration.

15. The method according to claim 14, further comprising calculating a terrain surface roughness value, the terrain surface roughness value being an average of the first, second and third surface roughness index values.

* * * * *